United States Patent
Urushizaki et al.

(10) Patent No.: US 11,565,967 B2
(45) Date of Patent: Jan. 31, 2023

(54) GLASS COMPOSITION FOR GLASS FIBERS, GLASS FIBERS, GLASS FIBER FABRIC, AND GLASS FIBER-REINFORCED RESIN COMPOSITION

(71) Applicant: NITTO BOSEKI CO., LTD., Fukushima (JP)

(72) Inventors: Masaru Urushizaki, Fukushima (JP); Takanobu Hosokawa, Fukushima (JP); Takashi Nonaka, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 0 days.

(21) Appl. No.: 17/623,068

(22) PCT Filed: Dec. 24, 2020

(86) PCT No.: PCT/JP2020/048603
§ 371 (c)(1),
(2) Date: Dec. 27, 2021

(87) PCT Pub. No.: WO2021/205698
PCT Pub. Date: Oct. 14, 2021

(65) Prior Publication Data
US 2022/0204392 A1 Jun. 30, 2022

(30) Foreign Application Priority Data

Apr. 10, 2020 (JP) .............................. JP2020-071188

(51) Int. Cl.
*C03C 13/00* (2006.01)
*C03C 3/118* (2006.01)
*C03C 3/091* (2006.01)
C03C 13/04 (2006.01)

(52) U.S. Cl.
CPC ............. *C03C 13/00* (2013.01); *C03C 3/091* (2013.01); *C03C 3/118* (2013.01); C03C 13/045 (2013.01)

(58) Field of Classification Search
CPC .......... C03C 3/091; C03C 3/11; C03C 3/118; C03C 13/00
See application file for complete search history.

(56) References Cited

U.S. PATENT DOCUMENTS

| 5,958,808 | A | * | 9/1999 | Mori | ....................... C03C 13/00 501/36 |
|---|---|---|---|---|---|
| 6,043,171 | A | | 3/2000 | Siebers et al. | |
| 6,309,990 | B2 | | 10/2001 | Tamura et al. | |
| 2013/0333594 | A1 | | 12/2013 | Berthereau et al. | |
| 2018/0127305 | A1 | * | 5/2018 | Li | ........................... C03C 13/00 |
| 2020/0199015 | A1 | | 6/2020 | Hosokawa et al. | |
| 2021/0206687 | A1 | * | 7/2021 | Hsu | ......................... C03C 3/093 |

FOREIGN PATENT DOCUMENTS

| CN | 102503153 A | 6/2012 |
|---|---|---|
| CN | 103351102 A | 10/2013 |
| JP | H11-43352 A | 2/1999 |
| JP | 2004-107112 A | 4/2004 |
| JP | 6468409 B1 | 2/2019 |
| JP | 2019-081909 A | 5/2019 |
| WO | 98/16482 A1 | 4/1998 |

OTHER PUBLICATIONS

Office Action dated Apr. 14, 2022 issued in corresponding Chinese Patent Application No. 202080043970.3.

* cited by examiner

*Primary Examiner* — Elizabeth A. Bolden
(74) *Attorney, Agent, or Firm* — Carrier Shende & Associates, P.C.; Fulchand P. Shende; Joseph P. Carrier

(57) ABSTRACT

A glass composition for glass fiber includes $SiO_2$ in the range of 52.0% by mass or more and 56.0% by mass or less; $B_2O_3$ in the range of 21.0% by mass or more and 24.5% by mass or less; $Al_2O_3$ in the range of 9.5% by mass or more and 13.0% by mass or less; MgO in the range of 0% by mass or more and less than 1.0% by mass; CaO in the range of 0.5% by mass or more and 5.5% by mass or less; SrO in the range of 0.5% by mass or more and 6.0% by mass or less; and $TiO_2$ in the range of 0.1% by mass or more and 3.0% by mass or less; and includes $F_2$ and $Cl_2$ in the range of 0.1% by mass or more and 2.0% by mass or less in total, with respect to the total amount.

7 Claims, No Drawings

US 11,565,967 B2

GLASS COMPOSITION FOR GLASS FIBERS, GLASS FIBERS, GLASS FIBER FABRIC, AND GLASS FIBER-REINFORCED RESIN COMPOSITION

TECHNICAL FIELD

The present invention relates to a glass composition for glass fiber, glass fiber formed from the glass composition for glass fiber, a glass fiber woven fabric including the glass fiber, and a glass fiber-reinforced resin composition including the glass fiber.

BACKGROUND ART

Glass fiber is manufactured by melting a glass raw material prepared so as to be a glass composition for glass fiber having a desired composition in a glass melting furnace to form molten glass (a melt of the glass composition for glass fiber); discharging the molten glass from a container (bushing) having a nozzle plate on which several to thousands of nozzle tips are formed; and cooling the discharged molten glass while stretching by winding at a high speed to solidify it into fiber (hereinafter, this operation is sometimes referred to as "spinning"). The above bushing is formed from a noble metal such as platinum.

Conventionally, glass fiber has been widely used in various applications to improve the strength of resin molded products, and the resin molded products have been increasingly used for a housing or a part of electronic devices such as a server, a smartphone, and a laptop computer, and the like.

In general, glass absorbs energy from alternating current as heat, and thus has a problem that the above resin molded product generates heat when the resin molded product is used for a housing or a part of the electronic devices.

The dielectric loss energy absorbed by glass is proportional to the dielectric constant and the dielectric loss tangent determined by the component and the structure of the glass, and is represented by the following formula (A):

$$W = kfv^2 \times \varepsilon^{1/2} \times \tan \gamma \quad (A).$$

wherein W is a dielectric loss energy, k is a constant, f is a frequency, $v^2$ is a potential gradient, $\varepsilon$ is a dielectric constant, and $\tan \delta$ is a dielectric loss tangent. From formula (A), it is found that the dielectric loss is larger and heat generation of the above resin molded product is larger as the dielectric constant and the dielectric loss tangent are larger and as the frequency is higher.

In recent years, in response to the fact that the frequency (f in the above formula (A)) of the alternating current used in a housing or a part of the above electronic devices has increased, a lower dielectric constant and a lower dielectric loss tangent have been required for the glass fiber used for a housing or a part of the above electronic device in order to reduce dielectric loss energy. In particular, a low dielectric loss tangent is required because the dielectric loss tangent has larger influence on the formula (A) than that of the dielectric constant, which is raised to the power of ½.

In response to the demand, the present applicant has suggested, as a glass composition for glass fiber having a low dielectric constant and a low dielectric loss tangent, suppressing the occurrence of phase separation for achieving efficient glass fiber formation, and reducing the viscosity at high temperatures, a glass composition for glass fiber including $SiO_2$ in the range of 52.0 to 59.5% by mass, $B_2O_3$ in the range of 17.5 to 25.5% by mass, $Al_2O_3$ in the range of 9.0 to 14.0% by mass, SrO in the range of 0.5 to 6.0% by mass, MgO in the range of 1.0 to 5.0% by mass, and CaO in the range of 1.0 to 5.0% by mass, and including $F_2$ and $Cl_2$ in the range of 0.1 to 2.5% by mass in total, with respect to the total amount of the glass composition for glass fiber (see Patent Literature 1).

CITATION LIST

Patent Literature

Patent Literature 1: Japanese Patent No. 6468409

SUMMARY OF INVENTION

Technical Problem

The present inventors, however, have found that, when glass fiber formed of the glass composition for glass fiber of Patent Literature 1 is industrially mass-produced using a glass melting furnace comprising a bushing having a nozzle plate on which 100 or more nozzle tips are formed, cut of glass fiber occurs during spinning, and thus the production efficiency is disadvantageously reduced.

In response to the disadvantage, the present inventors have made extensive investigations to find that cut of glass fiber during spinning is caused by a disadvantage: occurrence of striae. Here, in a glass melting furnace comprising a small bushing having a nozzle plate on which less than 100 nozzle tips are formed, the volume of the glass melting furnace is small in accordance with the size of the bushing, and the temperature in the glass melting furnace and the amount of the glass raw material volatilized are relatively uniform. On the other hand, in use of a glass melting furnace comprising a large bushing having a nozzle plate on which 100 or more nozzle tips are formed, the volume of the glass melting furnace is large in accordance with the size of the bushing, and thus variations may occur in the temperature in the glass melting furnace and the amount of the glass raw material volatilized. Such variations cause unevenness in the glass composition. A different type of glass generated due to this unevenness is streaked in the course of melting, and the streaks that appear as a difference in the refractive index in the glass are striae. Upon occurrence of striae, while the molten glass is discharged from the bushing and stretched by being wound at a high speed, the striae portion has a difference in the composition, which results in a difference in the viscosity. This difference in the viscosity inhibits drawing of the molten glass, and thus cut of glass fiber during spinning is presumed to easily occur.

An object of the present invention is to provide a glass composition for glass fiber having a low dielectric loss tangent and suppressing occurrence of striae by eliminating the disadvantage. Another object of the present invention is to provide glass fiber formed from the glass composition for glass fiber, a glass fiber woven fabric including the glass fiber, and a glass fiber-reinforced resin composition in which the glass fiber is employed.

Solution to Problem

In order to achieve the objects, the glass composition for glass fiber of the present invention includes: $SiO_2$ in a range of 52.0% by mass or more and 56.0% by mass or less; $B_2O_3$ in a range of 21.0% by mass or more and 24.5% by mass or less; $Al_2O_3$ in a range of 9.5% by mass or more and 13.0% by mass or less; MgO in a range of 0% by mass or more and less than 1.0% by mass; CaO in a range of 0.5% by mass or more and 5.5% by mass or less; SrO in a range of 0.5% by mass or more and 6.0% by mass or less; and $TiO_2$ in a range of 0.1% by mass or more and 3.0% by mass or less; and includes $F_2$ and $Cl_2$ in a range of 0.1% by mass or more and 2.0% by mass or less in total, with respect to the total amount of the glass composition for glass fiber.

According to the glass composition for glass fiber according to the present invention, including $SiO_2$, $B_2O_3$, $Al_2O_3$, MgO, CaO, SrO, $TiO_2$, and $F_2$ or $Cl_2$ in the above range results in having a low dielectric loss tangent and suppressing the occurrence of striae.

Having a low dielectric loss tangent means that the dielectric loss tangent is 0.00185 or less at a frequency of 10 GHz.

In the glass composition for glass fiber of the present invention, a content M (% by mass) of MgO, a content C (% by mass) of CaO, a content S (% by mass) of SrO, and a content T (% by mass) of $TiO_2$ preferably satisfy the following formula (1):

$$0.60 \leq S^{3/2}/\{(M+S+T) \times C^{1/2}\} \leq 1.07 \quad (1).$$

When the above M, C, S, and T satisfy the above formula (1), the glass composition for glass fiber of the present invention more securely has a low dielectric loss tangent and suppresses the occurrence of striae.

In the glass composition for glass fiber of the present invention, the above M, C, S, and T more preferably satisfy the following formula (2):

$$0.66 \leq S^{3/2}/\{(M+S+T) \times C^{1/2}\} \leq 1.07 \quad (2).$$

When the above M, C, S, and T satisfy the above formula (2), the glass composition for glass fiber of the present invention has a lower dielectric loss tangent and suppresses the occurrence of striae.

Having a lower dielectric loss tangent here means that the dielectric loss tangent is 0.00175 or less at a frequency of 10 GHz.

In the glass composition for glass fiber of the present invention, the above M, C, S, and T still more preferably satisfy the following formula (3):

$$0.66 \leq S^{3/2}/\{(M+S+T) \times C^{1/2}\} \leq 0.78 \quad (3).$$

When the above M, C, S, and T satisfy the above formula (3), the glass composition for glass fiber of the present invention has an extremely low dielectric loss tangent and suppresses the occurrence of striae.

Having an extremely low dielectric loss tangent means that the dielectric loss tangent is 0.00170 or less at a frequency of 10 GHz.

The glass fiber of the present invention is formed from the above glass composition for glass fiber of the present invention. The glass fiber of the present invention can be obtained by, for example, melting the above glass composition for glass fiber of the present invention, discharging the obtained melt from a bushing having a nozzle plate with 1 to 8000 nozzle tips or holes formed therein, and cooling the melt while stretching by winding at a high speed to solidify it into a fiber. Accordingly, the glass fiber of the present invention comprises the glass composition identical to that of the above glass composition for glass fiber of the present invention.

The glass fiber woven fabric of the present invention includes the above glass fiber of the present invention.

The glass fiber-reinforced resin composition of the present invention includes the above glass fiber of the present invention. The glass fiber-reinforced resin composition of the present invention includes 10 to 90% by mass of glass fiber of the present invention in the glass fiber-reinforced resin composition including, for example, a resin (thermoplastic resin or thermosetting resin), glass fiber, and other additives, with respect to the total amount of the glass fiber-reinforced resin composition.

DESCRIPTION OF EMBODIMENTS

Hereinafter, embodiments of the present invention will be described in detail.

The glass composition for glass fiber of the present embodiment includes $SiO_2$ in the range of 52.0% by mass or more and 56.0% by mass or less; $B_2O_3$ in the range of 21.0% by mass or more and 24.5% by mass or less; $Al_2O_3$ in the range of 9.5% by mass or more and 13.0% by mass or less; MgO in the range of 0% by mass or more and less than 1.0% by mass; CaO in the range of 0.5% by mass or more and 5.5% by mass or less; SrO in the range of 0.5% by mass or more and 6.0% by mass or less; and $TiO_2$ in the range of 0.1% by mass or more and 3.0% by mass or less; and includes $F_2$ and $C_2$ in the range of 0.1% by mass or more and 2.0% by mass or less in total, with respect to the total amount of the glass composition for glass fiber. According to the glass composition for glass fiber, including $SiO_2$, $B_2O_3$, $Al_2O_3$, MgO, CaO, SrO, $TiO_2$, and $F_2$ or $C_2$ in the above range results in having a low dielectric loss tangent and suppressing the occurrence of striae.

When the glass composition for glass fiber of the present embodiment has a content of $SiO_2$ of less than 52.0% by mass with respect to the total amount of the glass composition for glass fiber, the mechanical strength of the glass fiber formed from the glass composition for glass fiber is greatly reduced, and the function of the glass fiber as a reinforcing material in the glass fiber-reinforced resin composition is impaired. In addition, the glass fiber tends to deteriorate when placed in an acidic environment. On the other hand, when the content of $SiO_2$ is more than 56.0% by mass with respect to the total amount of the glass composition for glass fiber, the viscosity at high temperatures increases. Thus, the temperature at which the glass raw material is melted rises, and from the viewpoint of production cost, the glass composition for glass fiber of the present embodiment will be not suitable to industrial glass fiber production using a glass melting furnace comprising a bushing having a nozzle plate on which 100 or more nozzle tips are formed.

In the glass composition for glass fiber of the present embodiment, the content of $SiO_2$ with respect to the total amount of the glass composition for glass fiber is preferably 52.5% by mass or more and 55.5% by mass or less, more preferably 53.1% by mass or more and 54.9% by mass or less, still more preferably 53.3% by mass or more and 54.6% by mass or less, particularly preferably 53.5% by mass or more and 54.3% by mass or less, and most preferably 53.6% by mass or more and 54.2% by mass or less.

When the glass composition for glass fiber of the present embodiment has a content of $B_2O_3$ of less than 21.0% by mass with respect to the total amount of the glass composition for glass fiber, the dielectric loss tangent of the glass composition for glass fiber cannot be sufficiently reduced. On the other hand, when the content of $B_2O_3$ is more than 24.5% by mass with respect to the total amount of the glass composition for glass fiber, the chemical durability of the glass composition for glass fiber may deteriorate.

In the glass composition for glass fiber of the present embodiment, the content of $B_2O_3$ with respect to the total amount of the glass composition for glass fiber is preferably 22.6% by mass or more and 24.5% by mass or less, more preferably 22.8% by mass or more and 24.5% by mass or less, still more preferably 23.0% by mass or more and 24.5% by mass or less, particularly preferably 23.1% by mass or more and 24.4% by mass or less, and most preferably 23.3% by mass or more and 24.2% by mass or less.

When the glass composition for glass fiber of the present embodiment has a content of $Al_2O_3$ of less than 9.5% by mass with respect to the total amount of the glass composition for glass fiber, the chemical durability of the glass composition for glass fiber may deteriorate. On the other hand, when the content of $Al_2O_3$ is more than 13.0% by mass with respect to the total amount of the glass composition for glass fiber, the dielectric loss tangent of the glass composition for glass fiber cannot be sufficiently reduced.

In the glass composition for glass fiber of the present embodiment, the content of $Al_2O_3$ with respect to the total amount of the glass composition for glass fiber is preferably 11.0% by mass or more and 12.8% by mass or less, more preferably 11.2% by mass or more and 12.7% by mass or less, still more preferably 11.4% by mass or more and 12.6% by mass or less, particularly preferably 11.6% by mass or more and 12.5% by mass or less, and most preferably 11.8% by mass or more and 12.3% by mass or less.

When the glass composition for glass fiber of the present embodiment has a content of MgO of 1.0% by mass or more with respect to the total amount of the glass composition for glass fiber, the occurrence of striae cannot be sufficiently suppressed.

In the glass composition for glass fiber of the present embodiment, the content of MgO with respect to the total amount of the glass composition for glass fiber is preferably 0% by mass or more and 0.9% by mass or less, more preferably 0% by mass or more and 0.8% by mass or less, still more preferably 0% by mass or more and 0.7% by mass or less, particularly preferably 0% by mass or more and 0.6% by mass or less, and most preferably 0.1% by mass or more and 0.5% by mass or less.

When the glass composition for glass fiber of the present embodiment has a content of CaO of less than 0.5% by mass or more than 5.5% by mass with respect to the total amount of the glass composition for glass fiber, the dielectric loss tangent of the glass composition for glass fiber cannot be sufficiently reduced while the chemical durability is maintained.

In the glass composition for glass fiber of the present embodiment, the content of CaO with respect to the total amount of the glass composition for glass fiber is preferably 1.5% by mass or more and 5.3% by mass or less, more preferably 2.0% by mass or more and 5.2% by mass or less, still more preferably 2.5% by mass or more and 5.1% by mass or less, particularly preferably 2.8% by mass or more and 5.0% by mass or less, especially preferably 2.9% by mass or more and 4.8% by mass or less, markedly preferably 2.9% by mass or more and 4.5% by mass or less, and most preferably 3.0% by mass or more and 4.0% by mass or less.

When the glass composition for glass fiber of the present embodiment has a content of SrO of less than 0.5% by mass or more than 6.0% by mass with respect to the total amount of the glass composition for glass fiber, the dielectric loss tangent of the glass composition for glass fiber cannot be sufficiently reduced.

In the glass composition for glass fiber of the present embodiment, the content of SrO with respect to the total amount of the glass composition for glass fiber is preferably 1.5% by mass or more and 5.8% by mass or less, more preferably 2.0% by mass or more and 5.5% by mass or less, still more preferably 2.2% by mass or more and 5.3% by mass or less, particularly preferably 2.5% by mass or more and 5.2% by mass or less, markedly preferably 3.0% by mass or more and 5.0% by mass or less, and most preferably 3.5% by mass or more and 4.5% by mass or less.

When the glass composition for glass fiber of the present embodiment has a content of $TiO_2$ of less than 0.1% by mass with respect to the total amount of the glass composition for glass fiber, the viscosity at high temperatures increases. Thus, the temperature at which the glass raw material is melted rises, and from the viewpoint of production cost, the composition will be not suitable to industrial glass fiber production using a glass melting furnace comprising a bushing having a nozzle plate on which 100 or more nozzle tips are formed. On the other hand, when the content of $TiO_2$ is more than 3.0% by mass with respect to the total amount of the glass composition for glass fiber, the dielectric loss tangent of the glass composition for glass fiber cannot be sufficiently reduced.

In the glass composition for glass fiber of the present embodiment, the content of $TiO_2$ with respect to the total amount of the glass composition for glass fiber is preferably 0.2% by mass or more and 2.8% by mass or less, more preferably 0.3% by mass or more and 2.7% by mass or less, still more preferably 0.4% by mass or more and 2.6% by mass or less, particularly preferably 0.5% by mass or more and 2.5% by mass or less, and most preferably 1.0% by mass or more and 2.0% by mass or less.

When the glass composition for glass fiber of the present embodiment has a total content of $F_2$ and $Cl_2$ of less than 0.1% by mass with respect to the total amount of the glass composition for glass fiber, the viscosity at high temperatures increases. Thus, the temperature at which the glass raw material is melted rises, and from the viewpoint of production cost, the composition will be not suitable to industrial glass fiber production using a glass melting furnace comprising a bushing having a nozzle plate on which 100 or more nozzle tips are formed. On the other hand, when the total content of $F_2$ and $Cl_2$ is more than 2.0% by mass with respect to the total amount of the glass composition for glass fiber, the chemical durability of the glass composition for glass fiber may deteriorate.

In the glass composition for glass fiber of the present embodiment, the total content of $F_2$ and $Cl_2$ with respect to the total amount of the glass composition for glass fiber is preferably 0.2% by mass or more and 1.8% by mass or less, more preferably 0.5% by mass or more and 1.5% by mass or less, still more preferably 0.6% by mass or more and 1.4% by mass or less, particularly preferably 0.7% by mass or more and 1.3% by mass or less, and most preferably 0.8% by mass or more and 1.2% by mass or less.

In the glass composition for glass fiber of the present embodiment, the content of $F_2$ is preferably 0.2% by mass or more and 1.8% by mass or less, more preferably 0.5% by mass or more and 1.5% by mass or less, still more preferably 0.6% by mass or more and 1.4% by mass or less, particularly preferably 0.7% by mass or more and 1.3% by mass or less, and most preferably 0.8% by mass or more and 1.2% by mass or less.

When the glass composition for glass fiber of the present embodiment includes 0.4% by mass or more of $F_2$, $Cl_2$ may not be substantially included (that is, the content of $Cl_2$ may be less than 0.01% by mass).

The glass composition for glass fiber of the present embodiment may include ZnO in the range of 0% by mass or more and 3.0% by mass or less with respect to the total amount of the glass composition for glass fiber. When the glass composition for glass fiber of the present embodiment includes ZnO and the content of ZnO is more than 3.0% by mass, a devitrified product tends to occur, and stable glass fiber manufacturing cannot be performed.

When the glass composition for glass fiber of the present embodiment includes ZnO, the content of ZnO with respect to the total amount of the glass composition for glass fiber is preferably 2.5% by mass or less, more preferably 1.5% by mass or less, and still more preferably 0.5% by mass or less.

The glass composition for glass fiber of the present embodiment may include $Fe_2O_3$ in the range of 0% by mass or more and 1.0% by mass or less with respect to the total amount of the glass composition for glass fiber. When the glass composition for glass fiber of the present embodiment includes $Fe_2O_3$, it is effective to set the content of $Fe_2O_3$ to 0.1% by mass or more and 0.6% by mass or less from the viewpoint of suppressing the bubble included in the glass fiber.

The glass composition for glass fiber of the present embodiment may include $SnO_2$ in the range of 0% by mass or more and 1.0% by mass or less with respect to the total amount of the glass composition for glass fiber. When the glass composition for glass fiber of the present embodiment includes $SnO_2$, it is effective to set the content of $SnO_2$ to 0.1% by mass or more and 0.6% by mass or less from the viewpoint of suppressing the bubble included in the glass fiber.

In the glass composition for glass fiber of the present embodiment, when the total content of $Na_2O$, $K_2O$, and $Li_2O$ is less than 1.0% by mass and the content of each component is less than 0.4% by mass with respect to the total amount of the glass composition for glass fiber, $Na_2O$, $K_2O$, or $Li_2O$ may be included. When the total content of $Na_2O$, $K_2O$, and $Li_2O$ is 1.0% by mass or more with respect to the total amount of the glass composition for glass fiber or the content of each component is 0.4% by mass or more, the dielectric constant and the dielectric loss tangent of the glass composition for glass fiber are greatly deteriorated.

In the glass composition for glass fiber of the present embodiment, when the content of $ZrO_2$ is less than 0.4% by mass with respect to the total amount of the glass composition for glass fiber, $ZrO_2$ may be included. When the content of $ZrO_2$ is 0.4% by mass or more with respect to the total amount of the glass composition for glass fiber, the devitrified product tends to occur, and stable glass fiber manufacturing cannot be performed.

In the glass composition for glass fiber of the present embodiment, when the content of $Cr_2O_3$ is less than 0.05% by mass with respect to the total amount of the glass composition for glass fiber, $Cr_2O_3$ may be included. When the content of $Cr_2O_3$ is 0.05% by mass or more with respect to the total amount of the glass composition for glass fiber, the devitrified product tends to occur, and stable glass fiber manufacturing cannot be performed.

The glass composition for glass fiber of the present embodiment may include, as impurities attributable to raw materials, less than 1.0% by mass of oxides of Ba, P, Mn, Co, Ni, Cu, Mo, W, Ce, Y, and La in total with respect to the total amount of the glass composition for glass fiber. Particularly when the glass composition for glass fiber of the present embodiment includes BaO, $P_2O_5$, $CeO_2$, $Y_2O_3$, or $La_2O_3$ as impurities, the content of each of the impurities is independently preferably less than 0.40% by mass, more preferably less than 0.20% by mass, still more preferably less than 0.10% by mass, particularly preferably less than 0.05% by mass, and most preferably less than 0.01% by mass.

When the glass composition for glass fiber of the present embodiment includes $Bi_2O_3$, $Gd_2O_3$, $Pr_2O_3$, $Sc_2O_3$, or $Yb_2O_3$ as impurities derived from the raw material, the content of each of the impurities is independently preferably less than 0.10% by mass, more preferably less than 0.05% by mass, and still more preferably less than 0.01% by mass.

In the glass composition for glass fiber of the present embodiment, the total content of $SiO_2$, $B_2O_3$, $Al_2O_3$, MgO, CaO, SrO, $TiO_2$, $F_2$, and $Cl_2$ is 98.0% by mass or more, preferably 98.5% by mass or more, more preferably 99.0% by mass or more, still more preferably 99.5% by mass or more, particularly preferably 99.8% by mass or more, and most preferably 100.0% by mass.

In the glass composition for glass fiber of the present embodiment, the content M (% by mass) of MgO, the content C (% by mass) of CaO, the content S (% by mass) of SrO, and the content T (% by mass) of $TiO_2$ preferably satisfy the following formula (1):

$$0.60 \leq S^{3/2}/\{(M+S+T) \times C^{1/2}\} \leq 1.07 \quad (1).$$

In glass composition for glass fiber of the present embodiment, the M, C, S, and T more preferably satisfy the following formula (2):

$$0.66 \leq S^{3/2}/\{(M+S+T) \times C^{1/2}\} \leq 1.07 \quad (2).$$

When the M, C, S and T satisfy the formula (2), the glass composition for glass fiber of the present embodiment has a lower dielectric loss tangent and suppresses the occurrence of striae.

In the case where the M, C, S, and T satisfy the formula (2), the glass composition for glass fiber of the present embodiment preferably includes $SiO_2$ in the range of 53.6% by mass or more and 54.6% by mass or less; $B_2O_3$ in the range of 22.9% by mass or more and 24.4% by mass or less; $Al_2O_3$ in the range of 11.5% by mass or more and 12.5% by mass or less; MgO in the range of 0% by mass or more and 0.9% by mass or less; CaO in the range of 2.0% by mass or more and 5.0% by mass or less; SrO in the range of 3.0% by mass or more and 5.0% by mass or less; $TiO_2$ in the range of 0.5% by mass or more and 2.0% by mass or less; and $F_2$ in the range of 0.5% by mass or more and 1.5% by mass or less.

In the glass composition for glass fiber of the present embodiment, the M, C, S, and T still more preferably satisfy the following formula (4):

$$0.66 \leq S^{3/2}/\{(M+S+T) \times C^{1/2}\} \leq 0.79 \quad (4).$$

When the M, C, S and T satisfy the formula (4), the glass composition for glass fiber of the present embodiment more securely has a lower dielectric loss tangent and suppresses the occurrence of striae.

In the case where the M, C, S, and T satisfy the formula (4), the glass composition for glass fiber of the present embodiment preferably includes $SiO_2$ in the range of 53.6% by mass or more and 54.6% by mass or less; $B_2O_3$ in the range of 2.9% by mass or more and 24.4% by mass or less; $Al_2O_3$ in the range of 11.5% by mass or more and 12.5% by mass or less; MgO in the range of 0% by mass or more and 0.7% by mass or less; CaO in the range of 2.8% by mass or more and 5.0% by mass or less; SrO in the range of 3.0% by mass or more and 4.5% by mass or less; $TiO_2$ in the range of 0.5% by mass or more and 2.0% by mass or less; and $F_2$ in the range of 0.5% by mass or more and 1.5% by mass or less.

In the glass composition for glass fiber of the present embodiment, the M, C, S, and T particularly preferably satisfy the following formula (3):

$$0.66 \leq S^{3/2}/\{(M+S+T) \times C^{1/2}\} \leq 0.78 \qquad (3).$$

When the M, C, S, and T satisfy the formula (3), the glass composition for glass fiber of the present embodiment has an extremely low dielectric loss tangent and suppresses the occurrence of striae.

In the case where the M, C, S, and T satisfy the formula (3), the glass composition for glass fiber of the present embodiment preferably includes $SiO_2$ in the range of 53.6% by mass or more and 54.2% by mass or less; $B_2O_3$ in the range of 2.9% by mass or more and 24.4% by mass or less; $Al_2O_3$ in the range of 12.0% by mass or more and 12.5% by mass or less; MgO in the range of 0% by mass or more and 0.5% by mass or less; CaO in the range of 2.8% by mass or more and 5.0% by mass or less; SrO in the range of 3.0% by mass or more and 4.0% by mass or less; $TiO_2$ in the range of 0.5% by mass or more and 2.0% by mass or less; and $F_2$ in the range of 0.5% by mass or more and 1.5% by mass or less.

In the glass composition for glass fiber of the present embodiment, the M, C, S, and T most preferably satisfy the following formula (5):

$$0.72 \leq S^{3/2}/\{(M+S+T) \times C^2\} \leq 0.78 \qquad (5).$$

When the M, C, S, and T satisfy the formula (5), the glass composition for glass fiber of the present embodiment more securely has an extremely low dielectric loss tangent and suppresses the occurrence of striae.

Regarding measurement of the content of each component described above in the glass composition for glass fiber of the present embodiment, the content of Li as the light element can be measured with an ICP emission spectroscopic analyzer, and the contents of the other elements can be measured with a wavelength dispersive X-ray fluorescence analyzer.

The measurement method is as follows. First, a glass batch (prepared by mixing glass raw material) or glass fiber (when organic matter adheres to the surface of the glass fiber, or when glass fiber is mainly included as a reinforcing material in organic matter (resin), the glass fiber is used after the organic matter is removed by, for example, heating for about 0.5 to 24 hours in a muffle furnace at 300 to 650° C.) is placed in a platinum crucible, and melted with stirring while being held at a temperature of 1550° C. for the glass batch and at a temperature of 1400° C. for the glass fiber for 6 hours in an electric furnace to obtain a homogeneous molten glass. Next, the obtained molten glass is poured onto a carbon plate to produce a glass cullet, and then pulverized and powdered into glass powder. Regarding Li as a light element, the resulting glass powder is thermally decomposed with an acid and then quantitatively analyzed using an ICP emission spectroscopic analyzer. Regarding other elements, the glass powder is molded into a disc shape by a pressing machine and then quantitatively analyzed using a wavelength dispersive X-ray fluorescence analyzer. These quantitative analysis results are converted in terms of oxides to calculate the content of each component and the total amount, and the above content of each component can be determined from these numerical values.

The glass composition for glass fiber of the present embodiment can be obtained by melting a glass raw material prepared to have the above composition after melt-solidification (glass batch) and then cooling to be solidified.

In glass composition for glass fiber of the present embodiment, the 1000 poise temperature is in the range of 1330 to 1400° C., preferably in the range of 1340 to 1390° C., more preferably in the range of 1345 to 1380° C., and still more preferably in the range of 1350 to 1375° C. In the glass composition for glass fiber of the present invention, the liquid phase temperature (the temperature at which crystal precipitation occurs for the first time when the temperature of the molten glass is lowered) is in the range of 1050 to 1240° C., preferably in the range of 1100 to 1210° C., more preferably 1130 to 1200° C., and still more preferably in the range of 1150 to 1195° C. In the glass composition for glass fiber of the present invention, the temperature range (working temperature range) between 1000 poise temperature and the liquid phase temperature is 200° C. or more, preferably in the range of 200 to 400° C., and more preferably in the range of 210 to 360° C.

When the glass fiber of the present embodiment is formed from the glass composition for glass fiber of the present embodiment, at first, the glass raw material prepared as described above is supplied to a glass melting furnace, and is melted at a temperature range of 1000 poise temperature or more, specifically, a temperature range of 1450 to 1550° C. The molten glass melted at the above temperature is then discharged from 100 to 8000 nozzle tips or holes controlled at a predetermined temperature and cooled while stretched by winding at high speed to be solidified into glass fiber.

Glass single fiber (glass filament) discharged from one nozzle tip or hole, cooled and solidified typically has a perfect circle cross-sectional shape and has a diameter of 3.0 to 35.0 μm. In applications that require low dielectric properties, the glass filament preferably has a diameter of 3.0 to 6.0 μm and more preferably a diameter of 3.0 to 4.5 μm. On the other hand, when the above nozzle tip has a non-circular shape and has a protrusion or a notch for rapidly cooling the molten glass, controlling the temperature condition can provide a glass filament having a non-circular (for example, elliptical and long-oval) cross-sectional shape. When the glass filament has an elliptical or long-oval cross-sectional shape, the ratio of the major axis to the minor axis of the cross-sectional shape (major axis/minor axis) is, for example, in the range of 2.0 to 10.0 and the fiber diameter (converted fiber diameter) when the cross-sectional area is converted to a perfect circle is in the range of 3.0 to 35.0 μm.

The glass fiber of the present embodiment typically has a shape of a glass fiber bundle (glass strand) in which 10 to 8000 glass filaments above are bundled, and has a weight in the range of 1 to 10000 tex (g/km). Glass filaments discharged from a plurality of nozzle tips or holes may be bundled into one glass fiber bundle or may be bundled into a plurality of glass fiber bundles.

The glass fiber of the present embodiment can have various forms, which are obtained by further processing the above glass strands, such as yarns, woven fabrics, knitted fabrics, non-woven fabrics (including chopped strand mats and multiaxial non-woven fabrics), chopped strands, rovings, and powders.

The glass fiber of the present embodiment may be coated with an organic matter on the surface thereof for the purposes such as improvement of glass filament convergence, improvement of adhesiveness between glass fiber and a resin, and improvement of uniform dispersibility of glass fiber in a mixture of glass fiber and resin or inorganic material. Examples of such an organic matter can include starch, urethane resins, epoxy resins, vinyl acetate resins, acrylic resins, modified polypropylene (particularly carboxylic acid-modified polypropylene), and a copolymer of (poly)carboxylic acid (particularly maleic acid) and an unsaturated monomer. The glass fiber of the present embodiment may be coated with the resin composition including a silane coupling agent, a lubricant, surfactant, and the like in addition to these resins. The glass fiber of the present embodiment may be coated with the treating agent composition not including the above resins and including a silane coupling agent, surfactant, and the like. Such a resin composition or treating agent composition covers the glass fiber at a rate of 0.03 to 2.0% by mass based on the mass of the glass fiber of the present embodiment in a state where it is not coated with the resin composition or the treating agent composition. The glass fiber can be coated with an organic matter by applying a resin solution or a resin composition solution to the glass fiber using a known method such as a roller applicator, for example, in the manufacturing process of the glass fiber and then drying the glass fiber to which the resin solution or the resin composition solution is applied. The glass fiber can be coated with an organic matter by immersing the glass fiber of the present embodiment in the form of a woven fabric in the treating agent composition solution and then drying the glass fiber to which the treating agent composition is applied.

Examples of the silane coupling agent include aminosilanes (such as γ-aminopropyltriethoxysilane, N-β-(aminoethyff-γ-aminopropyltrimethoxysilane, N-β-(aminoethyl)-N'-β-(aminoethyl)-γ-aminopropyltrimethoxysilane, and β-anilinopropyltrimethoxysilane), chlorosilanes (such as γ-chloropropyltrimethoxysilane), epoxysilanes (such as β(3,4-epoxycyclohexyffethyltrimethoxysilane and γ-glycidoxypropyltrimethoxysilane), mercaptosilanes (such as γ-mercaptotrimethoxysilane), vinylsilanes (such as vinyltrimethoxysilane and N-β-(N-vinylbenzylaminoethyff-γ-aminopropyltrimethoxysilane), and (meth)acrylsilanes (such as γ-methacryloxypropyltrimethoxysilane). In the present embodiment, the silane coupling agents may be used singly or in combination of two or more.

Examples of the lubricant include modified silicone oil, animal oils (such as beef tallow) and hydrogenated product thereof, vegetable oils (such as soybean oil, coconut oil, rapeseed oil, palm oil, and castor oil) and hydrogenated products thereof, animal waxes (such as beeswax and lanolin), vegetable waxes (such as candelilla wax and carnauba wax), mineral waxes (such as paraffin wax and montan wax), condensates of a higher saturated fatty acid and a higher saturated alcohol (such as stearates such as lauryl stearate), polyethyleneimine, polyalkylpolyamine alkylamide derivatives, fatty acid amides (for example, dehydrated condensates of polyethylenepolyamines such as diethylenetriamine, triethylenetetramine, and tetraethylenepentamine and fatty acids such as lauric acid, myristic acid, palmitic acid, and stearic acid), and quaternary ammonium salts (such as alkyltrimethylammonium salts such as lauryltrimethylammonium chloride). In the present embodiment, the lubricants may be used singly or in combination of two or more.

Examples of the surfactant include nonionic surfactants, cationic surfactants, anionic surfactants, and amphoteric surfactants. In the present embodiment, the surfactants may be used singly or in combination of two or more.

Examples of the nonionic surfactant include ethylene oxide propylene oxide alkyl ether, polyoxyethylene alkyl ether, polyoxyethylene-polyoxypropylene-block copolymer, alkyl polyoxyethylene-polyoxypropylene block copolymer ether, polyoxyethylene fatty acid ester, polyoxyethylene fatty acid monoester, polyoxyethylene fatty acid diester, polyoxyethylene sorbitan fatty acid ester, glycerol fatty acid ester ethylene oxide adduct, polyoxyethylene castor oil ether, hydrogenated castor oil ethylene oxide adduct, alkylamine ethylene oxide adduct, fatty acid amide ethylene oxide adduct, glycerol fatty acid ester, polyglycerol fatty acid ester, pentaerythritol fatty acid ester, sorbitol fatty acid ester, sorbitan fatty acid ester, sucrose fatty acid ester, polyhydric alcohol alkyl ether, fatty acid alkanolamide, acetylene glycol, acetylene alcohol, ethylene oxide adduct of acetylene glycol, and ethylene oxide adduct of acetylene alcohol.

Examples of the cationic surfactant include alkyldimethylbenzylammonium chloride, alkyltrimethylammonium chloride, alkyl dimethyl ethyl ammonium ethyl sulfate, higher alkylamine salts (such as acetate and hydrochloride), adduct of ethylene oxide to a higher alkylamine, condensate of a higher fatty acid and polyalkylene polyamine, a salt of an ester of a higher fatty acid and alkanolamine, a salt of higher fatty acid amide, imidazoline cationic surfactant, and alkyl pyridinium salt.

Examples of the anionic surfactant include higher alcohol sulfate salts, higher alkyl ether sulfate salts, α-olefin sulfate salts, alkylbenzene sulfonate salts, α-olefin sulfonate salts, reaction products of fatty acid halide and N-methyl taurine, dialkyl sulfosuccinate salts, higher alcohol phosphate ester salts, and phosphate ester salts of higher alcohol ethylene oxide adduct.

Examples of the amphoteric surfactant include amino acid amphoteric surfactants such as alkali metal salts of alkylaminopropionic acid, betaine amphoteric surfactants such as alkyldimethylbetaine, and imidazoline amphoteric surfactants.

The glass fiber woven fabric of the present embodiment includes the above glass fiber of the present embodiment. Specifically, the glass fiber woven fabric of the present embodiment can be obtained by weaving the above glass fiber of the present embodiment as at least a part of warp yarns or weft yarns with a loom known per se. Examples of the loom may include jet looms such as air jet or water jet looms, shuttle looms, and rapier looms. Examples of weaving with the loom may include plain weaving, satin weaving, mat weaving, and twill weaving. From the viewpoint of production efficiency, plain weaving is preferred. In the glass fiber woven fabric of the present embodiment, the above glass fiber of the present embodiment is preferably used as warp yarns and weft yarns.

In the glass fiber woven fabric of the present embodiment, the above glass fiber of the present embodiment is preferably formed by bundling 35 to 400 glass filaments each having a filament diameter of 3.0 to 9.0 μm, has a number of twists of 0 to 1.0 twist/25 mm, and has a mass of 0.9 to 69.0 tex (g/1000 m).

In the glass fiber woven fabric of the present embodiment, when the above glass fiber of the present embodiment is employed as warp yarns or weft yarns, the warp yarn weaving density is preferably 40 to 120 yarns/25 mm, and the weft yarn weaving density is preferably 40 to 120 yarns/25 mm.

The glass fiber woven fabric of the present embodiment, after woven, may be subjected to desizing treatment, surface treatment, and opening treatment.

An example of the desizing treatment is a treatment including placing the glass fiber woven fabric in a heating oven having an atmosphere temperature of 350° C. to 400° C. for 40 to 80 hours to thereby pyrolytically decompose organic matter adhering to the glass fiber.

An example of the surface treatment is a treatment including immersing the glass fiber woven fabric in a solution including the silane coupling agent or including the silane coupling agent and the surfactant, squeezing extra water therefrom, and heat-drying the woven fabric in a temperature range of 80 to 180° C. for 1 to 30 minutes.

An example of the opening treatment is a treatment in which the warp yarns of the glass fiber woven fabric are subjected to opening by means of water flow pressure, opening by means of high-frequency vibration using a liquid as a medium, opening by means of the pressure of a fluid having a surface pressure, opening by means of pressing with a roll, or the like under a tension of 30 to 200 N to thereby widen the width of the warp yarns and weft yarns.

The glass fiber woven fabric of the present embodiment has a thickness in the range of 7.0 to 190.0 g/m² and preferably a thickness in the range of 8.0 to 200.0 μm.

The yarn width of the warp yarns of the glass fiber woven fabric of the present embodiment is preferably 110 to 600 μm and the yarn width of the weft yarns thereof is preferably 110 to 600 μm.

The glass fiber woven fabric of the present embodiment may comprise a surface treatment layer including the silane coupling agent or the silane coupling agent and the surfactant. When the glass fiber woven fabric of the present embodiment includes the surface treatment layer, the surface treatment layer can have a mass in the range of 0.03 to 1.50% by mass, for example, with respect to the total amount of the glass fiber woven fabric including the surface treatment layer.

The glass fiber-reinforced resin composition of the present embodiment includes the above glass fiber of the present embodiment. Specifically, the glass fiber-reinforced resin composition of the present embodiment includes 10 to 90% by mass of glass fiber with respect to the total amount of the glass fiber-reinforced resin composition, as the glass fiber-reinforced resin composition including resin (thermoplastic resin or thermosetting resin), glass fiber, and other additives. The glass fiber-reinforced resin composition of the present embodiment includes 90 to 10% by mass of a resin and includes other additives in the range of 0 to 40% by mass with respect to the total amount of the glass fiber-reinforced resin composition.

Examples of the above thermoplastic resin can include polyethylene, polypropylene, polystyrene, styrene/maleic anhydride resins, styrene/maleimide resins, polyacrylonitrile, acrylonitrile/styrene (AS) resins, acrylonitrile/butadiene/styrene (ABS) resins, chlorinated polyethylene/acrylonitrile/styrene (ACS) resins, acrylonitrile/ethylene/styrene (AES) resins, acrylonitrile/styrene/methyl acrylate (ASA) resins, styrene/acrylonitrile (SAN) resins, methacrylic resins, polyvinyl chloride (PVC), polyvinylidene chloride (PVDC), polyamide, polyacetal, polyethylene terephthalate (PET), polybutylene terephthalate (PBT), polytrimethylene terephthalate (PTT), polycarbonate, polyarylene sulfide, polyethersulfone (PES), polyphenylsulfone (PPSU), polyphenylene ether (PPE), modified polyphenylene ether (m-PPE), polyaryl etherketone, liquid crystal polymer (LCP), fluororesins, polyetherimide (PEI), polyarylate (PAR), polysulfone (PSF), polyamideimide (PAI), polyaminobismaleimide (PABM), thermoplastic polyimide (TPI), polyethylene naphthalate (PEN), ethylene/vinyl acetate (EVA) resins, ionomer (JO) resins, polybutadiene, styrene/butadiene resins, polybutylene, polymethylpentene, olefin/vinyl alcohol resins, cyclic olefin resins, cellulose resins, and polylactic acid.

Specific examples of the polyethylene include high density polyethylene (HDPE), medium density polyethylene, low density polyethylene (LDPE), linear low density polyethylene (LLDPE), and ultra high molecular weight polyethylene.

Examples of the polypropylene include isotactic polypropylene, atactic polypropylene, syndiotactic polypropylene, and mixtures thereof.

Examples of the polystyrene include general-purpose polystyrene (GPPS), which is an atactic polystyrene having an atactic structure, high impact polystyrene (HIPS) with a rubber component added to GPPS, and syndiotactic polystyrene with syndiotactic structure.

Examples of the methacrylic resin include polymers obtained by homopolymerizing one of acrylic acid, methacrylic acid, styrene, methyl acrylate, ethyl acrylate, ethyl methacrylate, butyl acrylate, butyl methacrylate, and fatty acid vinyl ester, or polymers obtained by copolymerizing two or more of these.

Examples of the polyvinyl chloride include a vinyl chloride homopolymer, a copolymer of a vinyl chloride monomer and a copolymerizable monomer, or a graft copolymer obtained by graft polymerization of a vinyl chloride monomer to polymer polymerized by a conventionally known method such as emulsion polymerization method, suspension polymerization method, micro suspension polymerization method, or bulk polymerization method.

Examples of the polyamide can include one of components such as polycaproamide (nylon 6), polyhexamethylene adipamide (nylon 66), polytetramethylene adipamide (nylon 46), polytetramethylene sebacamide (nylon 410), polypentamethylene adipamide (nylon 56), polypentamethylene sebacamide (nylon 510), polyhexamethylene sebacamide (nylon 610), polyhexamethylene dodecamide (nylon 612), polydecamethylene adipamide (nylon 106), polydecamethylene sebacamide (nylon 1010), polydecamethylene dodecamide (Nylon 1012), polyundecanamide (Nylon 11), polyundecamethylene adipamide (Nylon 116), polydodecanamide (Nylon 12), polyxylene adipamide (nylon XD6), polyxylene sebacamide (nylon XD10), polymetaxylylene adipamide (nylon MXD6), polyparaxylylene adipamide (nylon PXD6), polytetramethylene terephthalamide (nylon 4T), polypentamethylene terephthalamide (nylon 5T), polyhexamethylene terephthalamide (nylon 6T), polyhexamethylene isophthalamide (nylon 6I), polynonamethylene terephthalamide (nylon 9T), polydecamethylene terephthalamide (nylon 10T), polyundecamethylene terephthalamide (nylon 11T), polydodecamethylene terephthalamide (nylon 12T), polytetramethylene isophthalamide (nylon 41), polybis(3-methyl-4-aminohexyl) methane terephthalamide (nylon PACMT), polybis(3-methyl-4-aminohexyl) methane isophthalamide (nylon PACMI), polybis(3-methyl-4-aminohexyl) methane dodecamide (nylon PACM12), and polybis(3-methyl-4-aminohexyl) methane tetradecamide (nylon PACM14) or copolymers or mixtures of two or more of the components.

Examples of the polyacetal include a homopolymer with oxymethylene units as the main repeating unit, and a copolymer mainly consisting of oxymethylene units and containing oxyalkylene units having 2 to 8 adjacent carbon atoms in the main chain.

Examples of the polyethylene terephthalate include a polymer obtained by polycondensation of terephthalic acid or a derivative thereof with ethylene glycol.

Examples of the polybutylene terephthalate include a polymer obtained by polycondensation of terephthalic acid or a derivative thereof with 1,4-butanediol.

Examples of the polytrimethylene terephthalate include polymers obtained by polycondensation of terephthalic acid or a derivative thereof with 1,3-propanediol.

Examples of the polycarbonate include polymers obtained by a transesterification method in which a dihydroxydiaryl compound is reacted with a carbonate such as diphenyl carbonate in a molten state; or polymers obtained by phosgene method in which a dihydroxyaryl compound is reacted with phosgene.

Examples of the polyarylene sulfide include linear polyphenylene sulfide, cross linked polyphenylene sulfide having a high molecular weight obtained by performing a curing reaction after polymerization, polyphenylene sulfide sulfone, polyphenylene sulfide ether, and polyphenylene sulfide ketone.

Examples of the polyphenylene ether include poly(2,3-dimethyl-6-ethyl-1,4-phenylene ether), poly(2-methyl-6-chloromethyl-1,4-phenylene ether), poly(2-methyl-6-hydroxyethyl-1,4-phenylene ether), poly(2-methyl-6-n-butyl-1,4-phenylene ether), poly(2-ethyl-6-isopropyl-1,4-phenylene ether), poly(2-ethyl-6-n-propyl-1,4-phenylene ether), poly(2,3,6-trimethyl-1,4-phenylene ether), poly[2-(4'-methylphenyl)-1,4-phenylene ether], poly(2-bromo-6-phenyl-1,4-phenylene ether), poly(2-methyl-6-phenyl-1,4-phenylene ether), poly(2-phenyl-1,4-phenylene ether), poly (2-chloro-1,4-phenylene ether), poly(2-methyl-1,4-phenylene ether), poly(2-chloro-6-ethyl-1,4-phenylene ether), poly(2-chloro-6-bromo-1,4-phenylene ether), poly(2,6-di-n-propyl-1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6-dibromo-1,4-phenylene ether), poly(2,6-dichloro-1,4-phenylene ether), poly(2,6-diethyl-1,4-phenylene ether), and poly(2,6-dimethyl-1,4-phenylene ether).

Examples of the modified polyphenylene ether include: a polymer alloy of poly(2,6-dimethyl-1,4-phenylene)ether and polystyrene; a polymer alloy of poly(2,6-dimethyl-1,4-phenylene)ether and a styrene/butadiene copolymer; a polymer alloy of poly(2,6-dimethyl-1,4-phenylene)ether and a styrene/maleic anhydride copolymer; a polymer alloy of poly(2,6-dimethyl-1,4-phenylene)ether and polyamide; a polymer alloy of poly(2,6-dimethyl-1,4-phenylene)ether and styrene/butadiene/acrylonitrile copolymer; one obtained by introducing a functional group such as an amino group, an epoxy group, a carboxy group, a styryl group, or the like at the polymer chain end of the polyphenylene ether; and one obtained by introducing a functional group such as an amino group, an epoxy group, a carboxy group, a styryl group, a methacryl group, or the like at the polymer chain side chain of the polyphenylene ether.

Examples of the polyaryl etherketone include polyetherketone (PEK), polyetheretherketone (PEEK), polyetherketoneketone (PEKK), and polyetheretherketoneketone (PEEKK).

Examples of the liquid crystal polymer (LCP) include a polymer (copolymer) consisting of one or more structural units selected from aromatic hydroxycarbonyl units which are thermotropic liquid crystal polyesters, aromatic dihydroxy units, aromatic dicarbonyl units, aliphatic dihydroxy units, aliphatic dicarbonyl units, and the like.

Examples of the fluororesin include polytetrafluoroethylene (PTFE), perfluoroalkoxy resins (PFA), fluorinated ethylene propylene resins (FEP), fluorinated ethylene tetrafluoroethylene resins (ETFE), polyvinyl fluoride (PVF), polyvinylidene fluoride (PVDF), polychlorotrifluoroethylene (PCTFE), and ethylene/chlorotrifluoroethylene resin (ECTFE).

Examples of the ionomer (IO) resin include copolymers of an olefin or a styrene and an unsaturated carboxylic acid, wherein a part of carboxyl groups is neutralized with a metal ion.

Examples of the olefin/vinyl alcohol resin include ethylene/vinyl alcohol copolymers, propylene/vinyl alcohol copolymers, saponified products of ethylene/vinyl acetate copolymers, and saponified products of propylene/vinyl acetate copolymers.

Examples of the cyclic olefin resin include monocyclic compounds such as cyclohexene, polycyclic compounds such as tetracyclopentadiene, and polymers of cyclic olefin monomers.

Examples of the polylactic acid include poly-L-lactic acid which is a homopolymer of L-form, poly-D-lactic acid which is a homopolymer of D-form, or a stereocomplex polylactic acid which is a mixture thereof.

Examples of the cellulose resin can include methylcellulose, ethyl cellulose, hydroxycellulose, hydroxymethylcellulose, hydroxyethyl cellulose, hydroxyethyl methylcellulose, hydroxypropylmethylcellulose, cellulose acetate, cellulose propionate, and cellulose butyrate.

Examples of the above thermosetting resin can include unsaturated polyester resins, vinyl ester resins, epoxy (EP) resins, melamine (MF) resins, phenol resins (PF), urethane resins (PU), polyisocyanate, polyisocyanurate, polyimide (PI), urea (UF) resins, silicone (SI) resins, furan (FR) resins, benzoguanamine (BR) resins, alkyd resins, xylene resins, bismaleimide triazine (BT) resins, and diallyl phthalate resin (PDAP).

Specific examples of the unsaturated polyester resin include resin obtained by esterification reaction of aliphatic unsaturated dicarboxylic acid and aliphatic diol.

Examples of the vinyl ester resin include bis vinyl ester resins and novolac vinyl ester resins.

Examples of the epoxy resin include bisphenol A epoxy resins, bisphenol F epoxy resins, bisphenol E epoxy resins, bisphenol S epoxy resins, bisphenol M epoxy resins (4,4'-(1,3-phenylenediisopropylidene)bisphenol epoxy resins), bisphenol P epoxy resins (4,4'-(1,4-phenylenediisopropylidene)bisphenol epoxy resins), bisphenol Z epoxy resins (4,4'-cyclohexylidne bisphenol epoxy resins), phenol novolac epoxy resins, cresol novolac epoxy resins, tetraphenol group ethane novolac type epoxy resins, novolac epoxy resins having a condensed ring aromatic hydrocarbon structure, biphenyl epoxy resins, aralkyl epoxy resins such as xylylene epoxy resins and phenyl aralkyl epoxy resins, naphthylene ether epoxy resins, naphthol epoxy resins, naphthalene diol epoxy resins, bifunctional or tetrafunctional epoxy naphthalene resins, binaphthyl epoxy resins, naphthalene aralkyl epoxy resins, anthracene epoxy resins, phenoxy epoxy resins, dicyclopentadiene epoxy resins, norbornene epoxy resins, adamantane epoxy resins, and fluorene epoxy resins.

Examples of the melamine resin include a polymer formed by polycondensation of melamine (2,4,6-triamino-1,3,5-triazine) and formaldehyde.

Examples of the phenolic resin include novolac phenolic resins such as phenol novolac resins, cresol novolac resins, and bisphenol A novolac resins, resol phenol resins such as methylol resole resins and dimethylene ether resole resins, or aryl alkylene phenol resins, and include one of these or combinations of two or more.

Examples of the urea resin include a resin obtained by condensation of urea and formaldehyde.

The above thermoplastic resin or the above thermosetting resin may be used singly or in combinations of two or more.

The glass fiber-reinforced resin composition of the present embodiment is used in applications that require low dielectric properties. Thus, as the resin, preferred are epoxy resins, modified polyphenylene ethers, polybutylene terephthalate, polypropylene, fluorine resins, and liquid crystal polymer (LCP).

Examples of the above other additives can include reinforcing fiber other than glass fiber (for example, carbon fiber and metal fiber), a filler other than glass fiber (for example, glass powder, talc, and mica), a flame retardant, an UV absorber, a heat stabilizer, an antioxidant, an antistatic agent, a fluidity improver, an anti-blocking agent, a lubricant, a nucleating agent, an antibacterial agent, and pigment.

The glass fiber-reinforced resin composition of the present embodiment may be prepreg obtained by impregnating the glass fiber woven fabric of the present embodiment with the resin by a known method per se and semi-curing the woven fabric.

The glass fiber-reinforced resin composition of the present embodiment can be molded by known molding methods such as injection molding method, injection compression molding method, two-color molding method, hollow molding method, foam molding method (including supercritical fluid), insert molding method, in-mold coating molding method, extrusion molding method, sheet molding method, thermoforming method, rotational molding method, laminate molding method, press molding method, blow molding method, stamping molding method, infusion method, hand lay-up method, spray-up method, resin transfer molding method, sheet molding compound method, bulk molding compound method, pultrusion method, and filament winding method to obtain various glass fiber-reinforced resin molded products. Curing the prepreg can also provide glass fiber-reinforced resin molded products.

Examples of applications of such molded products can include electronic device housing, electronic components (printed wiring board), vehicle exterior members (such as bumper, fender, bonnet, air dam, and wheel cover), vehicle interior members (such as door trim and ceiling materials), vehicle engine members (such as oil pan, engine cover, intake manifold, and exhaust manifold), muffler members (such as silencers), and high pressure tank.

The glass fiber of the present embodiment can be suitably used as a reinforcing material for inorganic materials such as gypsum and cement, in addition to the glass fiber-reinforced resin composition of the present embodiment. For example, when used as a reinforcing material for gypsum (especially, gypsum board having a thickness of 4 to 60 mm), the glass fiber comprising the glass composition in the above range can be included in a range of 0.1 to 4.0% by mass with respect to the total mass of gypsum.

Examples and Comparative Examples of the present invention will be shown.

EXAMPLES

At first, glass raw material was mixed to obtain a glass batch so that the glass composition after melt-solidification is the composition of Examples 1 to 5 or Comparative Examples 1 to 6 shown in Table 1.

Next, the glass batch corresponding to the glass composition for glass fiber of Examples 1 to 5 or Comparative Examples 1 to 6 was melted at 1550° C. for 6 hours to obtain homogeneous glass cullet. The glass cullet was then placed in an 80 mm diameter platinum crucible, melted at 1500° C. for 4 hours, and taken out from the crucible to obtain a glass bulk. The obtained glass bulk was then annealed at 580° C. for 8 hours to obtain a test piece. The dielectric loss tangent of the obtained test piece was measured by the following method.

The glass batch corresponding to each of the glass compositions for glass fiber of Examples 1 to 5 or Comparative Examples 1 to 6 or the glass cullet therefrom was melted in a glass melting furnace at 1550° C. The obtained melt was discharged from a bushing having a nozzle plate with 200 nozzle tips formed therein, cooled, and solidified to thereby provide glass beads. The obtained glass beads were gradually cooled under conditions of 580° C. and 8 hours. At least 40 of the gradually-cooled glass beads were subjected to evaluation of striae properties in accordance with the following method.

The evaluation results are shown in Table 1.

[Measurement Method of Dielectric Loss Tangent]

The test piece was polished to prepare an 80 mm×3 mm (1 mm thickness) polished test piece. The obtained polished test piece was completely dried and then stored in a room at 23° C. and a humidity of 60% for 24 hours. Subsequently, for each of the obtained polished test pieces, according to JIS C 2565: 1992, the dielectric loss tangent (dissipation factor Df) at 10 GHz was measured using a cavity resonator method dielectric constant measuring apparatus ADMS01Oc1 (trade name), manufactured by AET, Inc.

[Evaluation Method of Striae Properties]

The glass beads were observed with an optical microscope at a magnification of 20 to 50 times to count the number of glass beads having striae. Among the total number observed, a case where glass beads having striae is 40% or less was evaluated as "○", and a case of more than 40% was evaluated as "×".

TABLE 1

|  | Example 1 | Example 2 | Example 3 | Example 4 | Example 5 | Comparative Example 1 |
|---|---|---|---|---|---|---|
| $SiO_2$ Content (% by mass) | 54.2 | 53.6 | 54.6 | 54.2 | 54.4 | 55.6 |
| $B_2O_3$ Content (% by mass) | 23.8 | 24.4 | 22.9 | 23.4 | 23.0 | 22.4 |
| $Al_2O_3$ Content (% by mass) | 12.0 | 12.5 | 11.5 | 12.0 | 12.0 | 11.0 |
| MgO Content M (% by mass) | 0.5 | 0 | 0.7 | 0.9 | 0.3 | 1.5 |
| CaO Content C (% by mass) | 3.5 | 5.0 | 2.8 | 2.0 | 4.3 | 1.0 |
| SrO Content S (% by mass) | 4.0 | 3.0 | 4.5 | 5.0 | 3.5 | 5.5 |

TABLE 1-continued

|  |  |  |  |  |  |  |
|---|---|---|---|---|---|---|
| TiO$_2$ Content T (% by mass) | 1.0 | 0.5 | 2.0 | 1.5 | 1.5 | 2.0 |
| F$_2$ Content (% by mass) | 1.0 | 1.0 | 1.0 | 1.0 | 1.0 | 1.0 |
| Total content (% by mass) | 100.0 | 100.0 | 100.0 | 100.0 | 100.0 | 100.0 |
| S$^{(3/2)}$/{(M + S + T) × C$^{(1/2)}$} | 0.78 | 0.66 | 0.79 | 1.07 | 0.60 | 1.43 |
| Dielectric loss tangent | 0.00166 | 0.00169 | 0.00173 | 0.00172 | 0.00182 | 0.00162 |
| Striae | ○ | ○ | ○ | ○ | ○ | x |

|  | Comparative Example 2 | Comparative Example 3 | Comparative Example 4 | Comparative Example 5 | Comparative Example 6 |
|---|---|---|---|---|---|
| SiO$_2$ Content (% by mass) | 53.6 | 55.1 | 55.6 | 55.6 | 52.1 |
| B$_2$O$_3$ Content (% by mass) | 22.7 | 22.9 | 21.4 | 22.4 | 24.4 |
| Al$_2$O$_3$ Content (% by mass) | 12.4 | 11.5 | 10.5 | 10.0 | 12.0 |
| MgO Content M (% by mass) | 1.0 | 4.0 | 3.0 | 5.0 | 6.0 |
| CaO Content C (% by mass) | 3.1 | 3.0 | 4.0 | 1.0 | 1.5 |
| SrO Content S (% by mass) | 4.1 | 1.0 | 2.0 | 3.0 | 1.0 |
| TiO$_2$ Content T (% by mass) | 2.1 | 1.5 | 2.5 | 2.0 | 2.0 |
| F$_2$ Content (% by mass) | 1.0 | 1.0 | 1.0 | 1.0 | 1.0 |
| Total content (% by mass) | 100.0 | 100.0 | 100.0 | 100.0 | 100.0 |
| S$^{(3/2)}$/{(M + S + T) × C$^{(1/2)}$} | 0.65 | 0.09 | 0.19 | 0.52 | 0.09 |
| Dielectric loss tangent | 0.00170 | 0.00187 | 0.00192 | 0.00193 | 0.00207 |
| Striae | x | x | x | x | x |

As shown in Table 1, the glass composition for glass fiber of the present invention that includes SiO$_2$ in the range of 52.0% by mass or more and 56.0% by mass or less; B$_2$O$_3$ in the range of 21.0% by mass or more and 24.5% by mass or less; Al$_2$O$_3$ in the range of 9.5% by mass or more and 13.0% by mass or less; MgO in the range of 0% by mass or more and less than 1.0% by mass; CaO in the range of 0.5% by mass or more and 5.5% by mass or less; SrO in the range of 0.5% by mass or more and 6.0% by mass or less; and TiO$_2$ in the range of 0.1% by mass or more and 3.0% by mass or less; and includes F$_2$ and Cl$_2$ in the range of 0.1% by mass or more and 2.0% by mass or less in total, with respect to the total amount of the glass composition for glass fiber shown in each of Examples 1 to 5, had a low dielectric loss tangent (0.00185 or less) and suppressed the occurrence of striae.

On the other hand, the glass composition for glass fiber of Comparative Examples 1 to 6 had a content of MgO of 1.0% by mass or more, and the occurrence of striae was not suppressed. The glass composition for glass fiber of Comparative Examples 3 to 6 had a content of MgO of 2.0% by mass or more and did not have a low dielectric loss tangent.

Example 6

Glass raw materials were mixed so that the glass composition after melt-solidification had the same composition as in Example 1, and a glass batch was obtained. The glass batch was then melted at 1550° C. The obtained melt was discharged from a bushing having a nozzle plate with 200 nozzle tips formed therein, and cooled and solidified while stretched by being wound at a predetermined speed to thereby form glass fiber (glass filaments) comprising a perfect circular section and a fiber diameter of 5 μm. The obtained 200 glass filaments are applied with a sizing agent by an applicator to be bundled and wound on a collet to provide a glass fiber bundle. When the series of operation (spinning) were continued for 6 hours, no cut occurred in the glass fiber.

Comparative Example 7

Glass raw materials were mixed so that the glass composition after melt-solidification had the same composition as in Comparative Example 4, and a glass batch was obtained. The glass batch was then melted at 1550° C. The obtained melt was discharged from a bushing having a nozzle plate with 200 nozzle tips formed therein, and cooled and solidified while stretched by being wound at a predetermined speed to thereby form glass fiber (glass filaments) comprising a perfect circular section and a fiber diameter of 5 μm. The obtained 200 glass filaments are applied with a sizing agent by an applicator to be bundled and wound on a collet to provide a glass fiber bundle. When the series of operation (spinning) were continued for 6 hours, cut was occurred 20 times in the glass fiber.

It was confirmed from Example 6 and Comparative Example 7 that the glass composition for glass fiber of the present invention would enable glass fiber and glass fiber bundles to be produced while suppressing such cut. When the number of cut in the glass fiber is 7 or less during the spinning continued for 6 hours, a glass composition for glass fiber withstands common industrial production. The glass composition for glass fiber of the present invention was thus confirmed to sufficiently satisfy this level. In the case of industrial production of glass fiber, the number of cut in the glass fiber during the spinning continued for 6 hours is preferably 5 or less, more preferably 3 or less, and still more preferably 1 or less.

The invention claimed is:

1. A glass composition for glass fiber comprising:
    $SiO_2$ in a range of 52.0% by mass or more and 56.0% by mass or less;
    $B_2O_3$ in a range of 21.0% by mass or more and 24.5% by mass or less;
    $Al_2O_3$ in a range of 9.5% by mass or more and 13.0% by mass or less;
    MgO in a range of 0% by mass or more and less than 1.0% by mass;
    CaO in a range of 0.5% by mass or more and 4.8% by mass or less;
    SrO in a range of 0.5% by mass or more and 6.0% by mass or less;
    ZrO in a range of 0.0% by mass or more and 0.5% by mass or less; and
    $TiO_2$ in a range of 0.1% by mass or more and 3.0% by mass or less; and comprising
    at least one of $F_2$ and $Cl_2$, wherein a collective amount of $F_2$ and $Cl_2$ is in a range of 0.1% by mass or more and 2.0% by mass or less.

2. The glass composition for glass fiber according to claim 1, wherein a content M (% by mass) of MgO, a content C (% by mass) of CaO, a content S (% by mass) of SrO, and a content T (% by mass) of $TiO_2$ satisfy following formula (1):

$$0.60 \leq S^{3/2}/\{(M+S+T) \times C^{1/2}\} \leq 1.07 \qquad (1).$$

3. The glass composition for glass fiber according to claim 2, wherein the M, C, S, and T satisfy following formula (2):

$$0.66 \leq S^{3/2}/\{(M+S+T) \times C^{1/2}\} \leq 1.07 \qquad (2).$$

4. The glass composition for glass fiber according to claim 3, wherein the M, C, S, and T satisfy following formula (3):

$$0.66 \leq S^{3/2}/\{(M+S+T) \times C^{1/2}\} \leq 0.78 \qquad (3).$$

5. Glass fiber formed from the glass composition for glass fiber according to claim 1.

6. A glass fiber woven fabric comprising the glass fiber according to claim 5.

7. A glass fiber-reinforced resin composition comprising the glass fiber according to claim 5.

* * * * *

UNITED STATES PATENT AND TRADEMARK OFFICE
CERTIFICATE OF CORRECTION

PATENT NO. : 11,565,967 B2
APPLICATION NO. : 17/623068
DATED : January 31, 2023
INVENTOR(S) : Masaru Urushizaki, Takanobu Hosokawa and Takashi Nonaka It is certified that error appears in the above-identified patent and that said Letters Patent is hereby corrected as shown below:

In the Claims

Column 21:
Line 23, please replace the "r" in ZrO with an "n".

Signed and Sealed this
Twenty-fourth Day of October, 2023

Katherine Kelly Vidal
*Director of the United States Patent and Trademark Office*